United States Patent [19]

Michalak

[11] Patent Number: 5,292,238
[45] Date of Patent: Mar. 8, 1994

[54] APPARATUS FOR MAKING COTTON CANDY AND PREPARING IT FOR PACKAGING

[75] Inventor: David W. Michalak, Glendale Heights, Ill.

[73] Assignee: Mama Irene's Specialty Candies, Inc., Oak Creek, Wis.

[21] Appl. No.: 886,514

[22] Filed: May 20, 1992

[51] Int. Cl.⁵ .......................... A23G 3/00; A23G 3/10
[52] U.S. Cl. .......................... 425/9; 53/516; 83/155; 83/400; 425/142; 425/168; 426/512; 426/517; 426/660
[58] Field of Search .................. 425/9, 142, 168, 169, 425/171; 198/460, 464.3; 83/155, 400; 53/516, 519; 426/512, 515, 517, 660

[56] References Cited

U.S. PATENT DOCUMENTS

| | | | |
|---|---|---|---|
| 2,847,311 | 8/1958 | Doumak et al. | 426/571 |
| 3,221,675 | 12/1965 | Forkner | 426/272 |
| 3,268,055 | 8/1966 | Stein et al. | 198/464.3 |
| 3,279,394 | 10/1966 | Bowe | 425/9 |
| 3,436,927 | 4/1969 | Gruber | 426/516 |
| 3,930,043 | 12/1975 | Warning et al. | 426/515 |
| 4,040,512 | 8/1977 | Ness | 198/464.3 |
| 4,526,525 | 7/1985 | Oiso et al. | 425/9 |
| 5,038,915 | 8/1991 | Delsanto | 198/460 |
| 5,097,939 | 3/1992 | Shanklin et al. | 198/460 |

FOREIGN PATENT DOCUMENTS 60-42023  3/1985  Japan ..................... 425/142

*Primary Examiner*—Jay H. Woo
*Assistant Examiner*—Joseph Leyson
*Attorney, Agent, or Firm*—Ryan, Kees & Hohenfeldt

[57] ABSTRACT

An apparatus for manufacturing sections of cotton candy, and synchronously presenting them to the packaging machinery. The apparatus includes an extruder for melting and extruding sugar. The resulting sugar strands are moved onto a belt conveyor, forming a continuous bundle. A cutting blade is slidable, by an actuator, in a direction transverse to the belt conveyor, for cutting the bundle into sections of predetermined length. A paddle conveyor is positioned to receive the cut sections from the first conveyor. A control switch, activated by the passage of the paddles, is provided for controlling the actuation of the cutting blade. The switch is movable to various positions with respect to the paddle conveyor. The position of the switch with respect to the paddle conveyor determines the position of the sections on the paddle conveyor, thus aiding in the synchronization of the cut sections with the packaging machine.

6 Claims, 2 Drawing Sheets

APPARATUS FOR MAKING COTTON CANDY AND PREPARING IT FOR PACKAGING

BACKGROUND OF THE INVENTION

This invention relates to food manufacture, and in particular to apparatus for manufacturing food items in a continuous bundle and packaging that food in sections or packets.

Cotton candy, or more properly spun sugar candy, has long been a favorite confection at carnivals, amusements parks, and the like. Conventionally, sugar is melted and extruded from a spinning extrusion head, the spun sugar then being collected from a stationary dish surrounding the extrusion head and wound on a stick or paper cone. The inherent tackiness of the freshly extruded strands of spun sugar causes them to stick together in a loose mass resembling cotton batting.

Prior to the 1970s, however, cotton candy had not been successfully made and marketed for widespread distribution and later consumption. The main reason for this lack of success was that there were not sufficiently efficient machines for the automatic manufacture and packaging thereof. And because cotton candy is extremely lightweight, portions of it tend to float upward with air currents in the surrounding atmosphere. It was thus important to minimize human involvement with the apparatus, thus requiring essentially fully automatic production machinery.

A first attempt at such fully automatic cotton candy production machinery is shown in Warning, U.S. Pat. No. 3,930,043. This patent showed rotating pans surrounding the sugar extruders, with the cotton candy strands being pulled out of the pans and fed through a conveyor, where it was cut into sections. The sections were later individually packaged, so that they could be sold at some future date. While this device worked well, there was still room for improvement. Particularly, the rotating star blade cutter disclosed therein became filled with the sticky product, and in any case it was impossible to reliably maintain synchronization or adjustment of the star blade cutter and the cut sections of cotton candy with respect to the packaging machinery.

This invention relates to improvements to the apparatus set forth above, and solutions to some of the problems raised or not solved thereby.

SUMMARY OF THE INVENTION

The invention provides an apparatus for manufacturing sections of cotton candy, and synchronously presenting them to the packaging machinery. According to the invention, the apparatus includes means for melting and extruding sugar, thus producing sugar strands. Means are provided for causing those sugar strands to move onto a first conveyor, thus forming the sugar strands into a continuous bundle. A cutting blade is slidable, by an actuator, in a direction transverse to the first conveyor, for cutting the bundle into sections of predetermined length. A second conveyor is positioned to receive the cut sections from the first conveyor. This second conveyor is provided with trip markers along its length. Control means are provided for controlling the actuation of the cutting blade. This control means is activated by the passage of these trip markers. In one embodiment, the control means comprises a switch, which is activated by passage of one of the trip markers, upon activation of which the blade cuts the bundle. The switch is attached to a frame member of the second conveyor, and is movable to various positions with respect to the second conveyor, and also fixable in a single position. The position of the switch with respect to the second conveyor determines the position of the sections on the second conveyor so as to be synchronized with the packaging machine.

If the second conveyor is a paddle conveyor, the paddles of the conveyor, being provided for separating the cut sections from one another and presenting the sections individually to the packaging machine, may be used as the trip markers.

The pulling means may include one or more rollers positioned so as to require the bundle to pass between the rollers and the belt conveyor. Non-stick means may be applied to the outer surface of the rollers to inhibit adherence of the bundle to the rollers.

Other objects and advantages of the invention will become apparent hereinafter.

DESCRIPTION OF THE PREFERRED EMBODIMENTS

Figure 1:
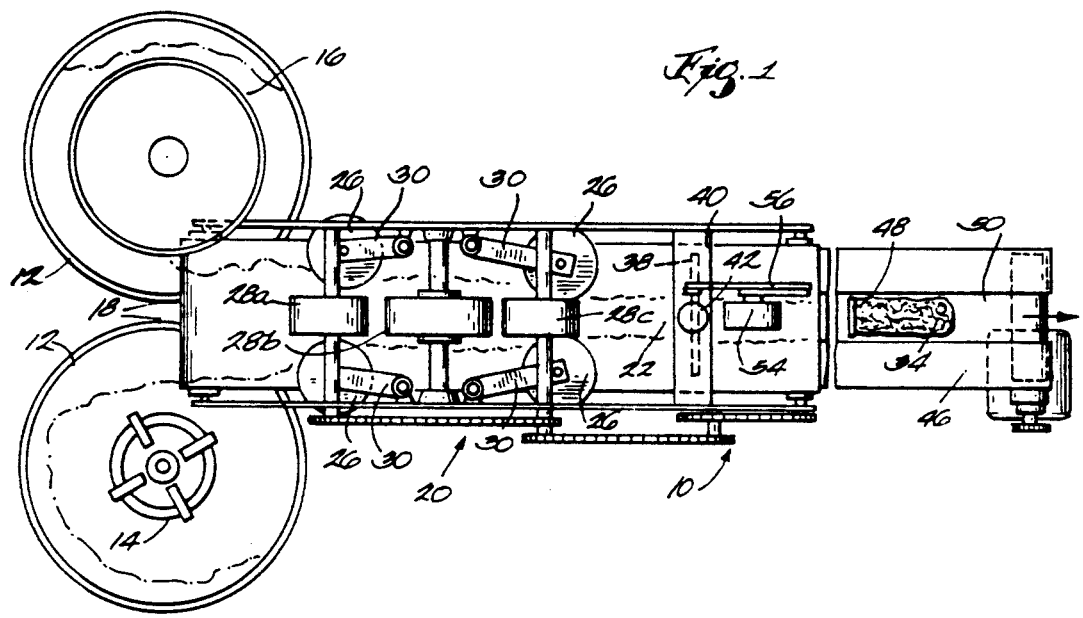
FIG. 1 is a top plan view of an apparatus constructed according to a preferred embodiment of the invention.
Figure 2:
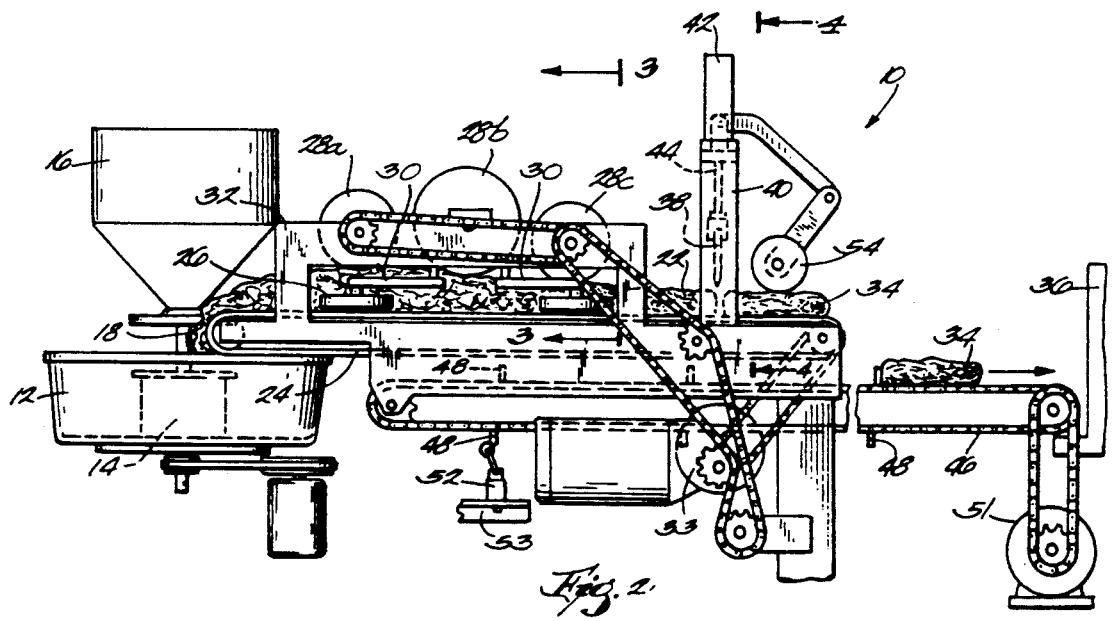
FIG. 2 is a side elevational view of the apparatus shown in FIG. 1.

Referring now to FIGS. 1 and 2, there is shown an apparatus 10 for manufacturing cotton candy according to one embodiment of the invention. As shown there, the apparatus includes a pair of collection pans 12, each having positioned therein an extruder 14, for melting sugar and extruding the melted sugar, although only one extruder is shown. A hopper 16 may be mounted above each of the extruders 14, in order to keep them supplied with sugar to be extruded. Again, only one hopper 16 is shown, for purposes of clarity of the drawing figures. The pans 12 and extruders 14 produce strands 18 of cotton candy in substantially the same manner as shown and described in warning, U.S. Pat. No. 3,930,043, referred to above. The disclosure of that patent is incorporated herein by reference.

From the pans 12, the strands 18 of cotton candy are fed or pulled into a sizing unit 20, where they are combined into a continuous bundle 22. According to the invention, the sizing unit 20 includes a first conveyor 24, which is oriented substantially horizontally and may be any suitable type of powered conveyor such as a belt conveyor. Mounted just above the top surface of first conveyor 24 are a number of side rollers 26 and top rollers 28. Each of the side rollers 26 rotates about a substantially vertical axis, which is journaled to a swing arm 30. Each swing arm 30 is biased toward the center of the conveyor 24. Each of the top rollers 28 rotates about a substantially horizontal axis, and is journaled to a frame 32 that positions the roller substantially over the center of the conveyor 24. The outer surface of the top rollers 28 may be coated with a non-stick substance to inhibit adherence of the sticky strands of the bundle 22 to the roller. Preferably there are three top rollers 28a, 28b and 28c. The center roller 28b is the largest of the three and free wheels in the frame 32. The first and third rollers 28a and 28c are driven by the same motor 33 that drives the first conveyor 24. The three rollers 28 are positioned so that their bottommost portions are progressively lower, first to last, so as to gently compact the strands 18 of cotton candy downward into continuous bundle 22.

Figure 3:
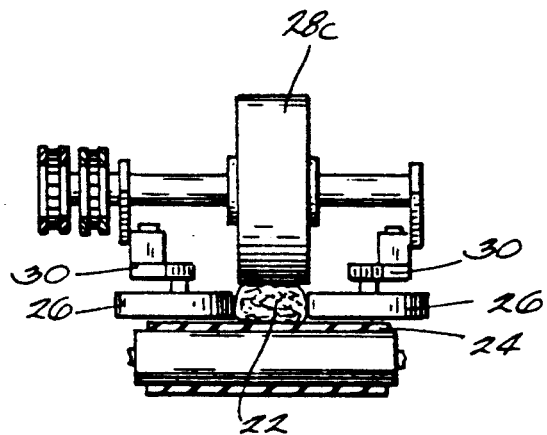
FIG. 3 is a cross sectional view of the apparatus shown in FIG. 2, taken generally along line 3—3 thereof.

As can be seen by comparing FIG. 1 with FIG. 3, the side rollers 26 and the top rollers 28 cooperate to produce a bundle 22 having a well defined size, and well defined boundaries. The spring rates of the biasing means of the side rollers 26, and the position of the top rollers 28, are chosen so as to maximize this definition without compressing the strands of spun candy so much as to change their character or texture.

Figure 4:
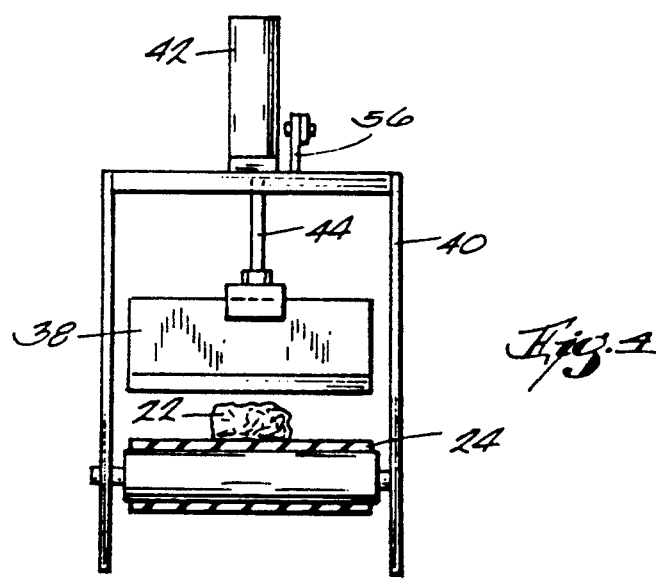
FIG. 4 is a cross sectional view of the apparatus shown in FIG. 2, taken generally along line 4—4 thereof.

Referring again to FIGS. 1 and 2, after being shaped by the rollers 26 and 28, the bundle 22 is cut into sections 34 of predetermined length, for individual packaging by a packaging machine 36. According to the invention, the cutting is performed by a knife blade 38, slidably mounted substantially vertically in a slider frame 40, attached to the conveyor frame 32, shown also in FIG. 4. The knife blade 38 is caused to slide in its frame 40 by a linear actuator 42. In the most preferred embodiment the linear actuator is a pneumatic cylinder, although another appropriate type of linear actuator may be used, such as a hydraulic cylinder or a solenoid. As shown in FIGS. 2 and 4, the knife blade 38 is attached to the actuator rod 44 of the linear actuator 42, and moves up and down therewith.

Referring once again now to FIGS. 1 and 2, a second conveyor 46 is provided for carrying the cut sections 34 of cotton candy to the packaging machine 36 for final packaging. The second conveyor 46 is shown to be a conveyor having a continuous drive means 50, such as a chain or belt. Second conveyor 46 is normally driven by a motor 51 different from the motor 33 driving the first conveyor 24.

As previously indicated, it was practically impossible to reliably maintain synchronization or adjustment of the prior art cutter and the cut sections of cotton candy with respect to the packaging machine 36, because of the different drive motors 33, 51. In order to ensure that the sections 34 are cut to the proper, predetermined length, at the proper time so that the packaging machine 36 receives the sections at the proper time to have the packaging applied to them, the invention calls for supplying the second conveyor 46 with trip markers 48, evenly distributed along the length of the drive means 50 of the conveyor. These trip markers 48 coact with a control means 52 (FIG. 2) which senses the passage of the trip markers and, upon the passage of each, activates the actuator 42 and knife blade 38 to cut off the bundle 22 and form a section 34. This control means 52 is attached to a portion 53 of the frame 32, and is movable along that portion, and fixable by any suitable means at any of a number of positions along that frame portion.

In the embodiment shown in FIGS. 1 and 2, the trip markers 48 are paddles, connected together by a drive chain or belt 50, and the second conveyor 46 is hence a paddle conveyor. And the control means 52 is a switch, activated by contact with the paddles 48. When the paddles 48 contact switch 52, the knife blade 38 is energized to cut off the bundle 22 as described above. Thus, changing the location of the switch 52 with respect to the conveyor 46 changes the point in time that the knife blade 38 cuts off the bundle 22. For instance, moving the switch to the right in FIG. 2 causes the knife blade 38 cut off the bundle 22 earlier, while moving it to the left causes it to cut off the bundle later. The optimum spot at which to locate the switch 52 is the spot that results in the bundle 22 being cut off just so that the cut section 34 is placed on the conveyor 46 just in front of the nearest paddle 48. Accordingly, synchronization of the sections 34 with the requirements of the packaging machine 36 is greatly facilitated by the present invention.

Further in the embodiment shown, there is provided a secondary roller 54, attached such as to the slider frame 40 by a linkage 56. The purpose of secondary roller 54 is to generally keep the last cut section 34 from rising with the knife blade 38 as the latter returns to its raised position. This secondary roller 54 may also have a non-stick coating applied to its outer periphery, so as to reduce sticking of the cut section thereto.

While the apparatus hereinbefore described is effectively adapted to fulfill the aforesaid objects, it is to be understood that the invention is not intended to be limited to the specific preferred embodiment of apparatus for making cotton candy and preparing it for packaging set forth above. Rather, it is to be taken as including all reasonable equivalents within the scope of the following claims.

I claim:

1. An apparatus for manufacturing sections of cotton candy, comprising:

means for melting and extruding sugar, producing strands of melted, extruded sugar;

means for pulling said strands of sugar onto a first conveyor, forming said strands into a continuous bundle, said first conveyor moving in a predetermined direction;

a cutting blade slidable, by an actuator, in a direction transverse to the direction of movement of said first conveyor, for cutting said bundle into sections of predetermined length;

a second conveyor, having an endless drive means, for receiving said cut sections from said first conveyor, said endless drive means having trip markers distributed along its length; and a switch, which is activated by passage of said trip markers, upon activation of which said blade cuts said bundle, wherein said switch is movable with respect to said second conveyor, and fixable in a single location with respect to said second conveyor, the location of said switch with respect to said second conveyor determining the location of said sections on said second conveyor.

2. An apparatus as recited in claim 1 wherein said pulling means includes one or more rollers positioned so as to require said bundle to pass between said one or more rollers and said first conveyor.

3. An apparatus as recited in claim 2 further comprising a non-stick coating applied to the outer surface of one or more of said rollers to inhibit adherence of said bundle to said rollers.

4. An apparatus for manufacturing sections of cotton candy, comprising:

means for melting and extruding sugar, and producing sugar strands;

means for causing said sugar strands to move onto a belt conveyor and for forming said sugar strands into a continuous bundle, said belt conveyor moving in a predetermined direction;

a cutting blade slidable, by an actuator, in a direction transverse to the direction of movement of said belt conveyor, for cutting said bundle into sections of predetermined length;

a paddle conveyor positioned to receive said cut sections from said belt conveyor, and having paddles for separating said cut sections; and a switch, which is activated by passage of said paddles, upon activation of which said blade cuts said bundle, wherein said switch is movable with respect to said paddle conveyor, and fixable in a single location with respect to said paddle conveyor, the location of said switch with respect to said paddle conveyor determining the relative location of said sections on said paddle conveyor.

5. An apparatus as recited in claim 4 wherein said means for causing said sugar strands to move onto said belt conveyor includes one or more rollers positioned so as to require said bundle to pass between said one or more rollers and said belt conveyor.

6. An apparatus as recited in claim 5 further comprising a non-stick coating applied to the outer surface of one or more of said rollers to inhibit adherence of said bundle to said roller.

* * * * *